E. V. DILLON.
FLOWER FOR MILLINERY PURPOSES.
APPLICATION FILED MAY 15, 1918. RENEWED MAY 5, 1922.
1,438,700.
Patented Dec. 12, 1922.
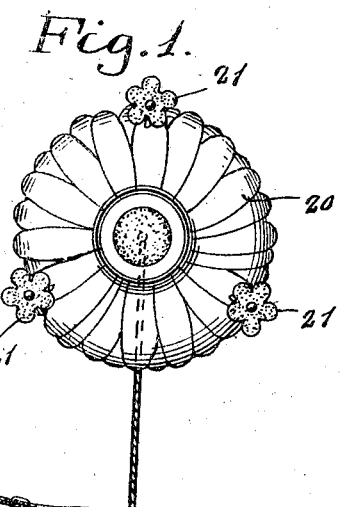
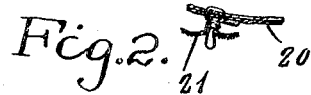
Inventor
E. V. Dillon.

Patented Dec. 12, 1922.

1,438,700

UNITED STATES PATENT OFFICE.

ELIZABETH V. DILLON, OF BOSTON, MASSACHUSETTS.

FLOWER FOR MILLINERY PURPOSES.

Application filed May 15, 1918, Serial No. 234,678. Renewed May 5, 1922. Serial No. 558,772.

*To all whom it may concern:*

Be it known that I, ELIZABETH V. DILLON, a citizen of the United States, residing at Boston, in the county of Suffolk and State of Massachusetts, have invented certain new and useful Improvements in Flowers for Millinery Purposes; and I do hereby declare the following to be a full, clear, and exact description of the invention, such as will enable others skilled in the art to which it appertains to make and use the same.

The object of the invention is to provide a decorative design or form of flower for millinery use, or in the trimming of hats, bonnets and the like, which shall have an attractive contrasting composite appearance for producing effects at a moderate cost which are either unattainable under ordinary conditions where the contrasts are produced by the combination of different flowers, each complete in itself, or can be secured only at a relatively greater expense which is undesirable in reference to materials which are used only for a short time and which under ordinary conditions must be changed from season to season or even during a season, to suit the taste of the wearer.

Further objects and advantages of the invention will appear in the course of the following description of preferred embodiments of the invention, it being understood that changes in form and relation may be resorted to within the scope of the appended claims without departing from the spirit of the invention.

In the drawings:

Figure 1 is a face view, illustrating a composite flower.

Figure 2 is a detail sectional view showing the means by which the smaller flower may be attached to the base formed by the larger flower.

Referring in detail to the drawing, the numeral 20 indicates a major flower element representing a daisy or similar flower and its outer section is formed to provide petals. Several auxiliary flower elements 21 representing forget-me-nots or the like are positioned in advance and in overlapping relation to the petals of the major flower elements and adjacent the peripheral edge of the latter and are secured to said major flower element as shown in Figure 2 so as to provide a decorative design or form of flower for millinery use which will have attractive contrasting composite appearance for producing effects at a moderate cost.

It will be understood that only one of the many modifications and combinations of flowers and colors which are possible along the lines indicated have been illustrated and described, but it will be seen that two or three composite flowers constructed substantially as indicated, the appearance of a plurality or bunch of flowers may be produced to afford a satisfactory trimming for a hat or bonnet, without the bulk of material which is ordinarily necessary in this connection in order to produce the desired contrast and effect sought by milliners.

Having described the invention, I claim:

1. A composite artificial flower having a major flower element having an outer section representing petals, auxiliary flower elements, the auxiliary flower elements being positioned adjacent the peripheral edge portion of the major flower element and partially overlapping the major flower element, and fastening means for the auxiliary flower element extending through the petal sections of the major flower element.

2. A composite artificial flower having a major flower element and auxiliary flower elements, the major flower element having an outer section representing petals and the auxiliary flower elements being positioned in overlapping relation to the petal sections of the major flower element and having fastening means extending through the petal sections.

In testimony whereof I affix my signature in presence of two witnesses.

ELIZABETH V. DILLON.

Witnesses:
EDMUND F. FUNK,
WILLIAM H. DAY.